G. H. F. HOLY.
INDUSTRIAL LOCOMOTIVE.
APPLICATION FILED JUNE 13, 1917.
1,256,230.
Patented Feb. 12, 1918.
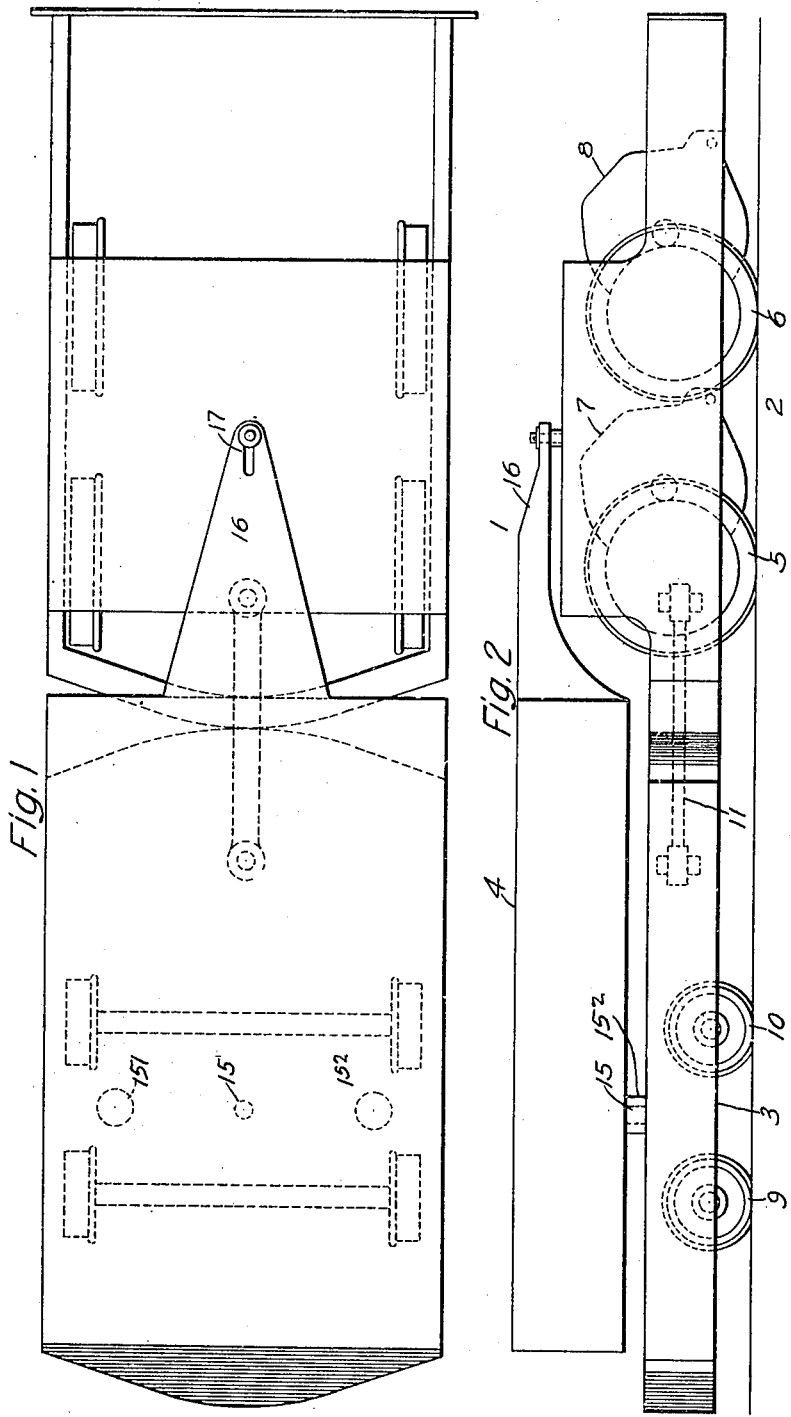
WITNESSES:
Fred. C. Wilharm
Wayne B. Wells
INVENTOR
George H. F. Holy
BY
Wesley G. Carr
ATTORNEY

UNITED STATES PATENT OFFICE.

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

INDUSTRIAL LOCOMOTIVE.

1,256,230.  Specification of Letters Patent.  Patented Feb. 12, 1918.

Application filed June 13, 1917. Serial No. 174,440.

*To all whom it may concern:*

Be it known that I, GEORGE H. F. HOLY, a citizen of the United States, and a resident of Pittsburgh, Pennsylvania, in the county of Allegheny and State of Pennsylvania, have invented a new and useful Improvement in Industrial Locomotives, of which the following is a specification.

My invention relates to locomotives and particularly to storage-battery locomotives for service in mines or other industrial properties.

One object of my invention is to provide a locomotive of the above indicated character that shall have a minimum height and be simple and rugged in construction.

Another object of my invention is to provide a storage-battery locomotive having a propelling truck, an auxiliary truck of low height having an articulated connection to the main truck, a battery section disposed above the auxiliary truck of low height in order not to increase the height of the locomotive, and means for pivotally supporting a portion of the weight of the battery section on each of said trucks.

In the prior art are disclosed storage-battery locomotives that are provided with two propelling trucks and storage battery sections disposed therebetween which are subjected to all the stresses and strains that are transmitted through the locomotives, and locomotives that are provided with storage-battery sections mounted directly on the main propelling trucks which are provided with long wheel bases.

In a locomotive constructed in accordance with my invention, the propelling motors and the storage battery are disposed on separate trucks but means is provided for pivotally supporting the weight of the battery section on both of the trucks. By so disposing the storage-battery section relative to the two trucks, it is a simple operation to disconnect the auxiliary truck and the battery section from the main truck having the propelling motors mounted thereon and utilize the main truck as a unitary locomotive supplied with energy from a trolley conductor.

In the accompanying drawings, Figure 1 is a plan view of a locomotive constructed in accordance with my invention, and Fig. 2 is a side elevational view of the locomotive illustrated in Fig. 1.

Referring to the accompanying drawing, a locomotive 1 is provided with a main propelling truck 2, an auxiliary low-height truck 3 and a section 4 for containing a storage battery.

The main propelling truck 2 embodies two pairs of propelling wheels 5 and 6 which are respectively provided with propelling motors 7 and 8. The auxiliary truck 3 is provided with two pairs of wheels 9 and 10 and is joined to the main truck 2 by means of an articulated connection 11.

The battery section 4 is located over the truck 3 and is connected thereto by means of a pivotal connection 15. The pivotal connection 15 between the battery-container section and the auxiliary truck is preferably relieved of the weight of the battery section by means of the side bearings 151 and 152 disposed on the idler truck 3 at opposite sides of the pivotal connection 13. A projection 16, which extends from the battery section 4, is pivotally connected to the main truck 2 which serves to support a portion of the weight of the battery section. The three-point support for the storage-battery-container section, embodying the side bearings 151, 152 and the projection 16, insures a uniform distribution of the weight of the battery-container section and improves the riding and tracking characteristics of the locomotive. A slot 17 is formed in the projection 16 in order to prevent the pivotal connection between the truck 2 and the battery section 4 from serving as a means for transmitting any portion of the draw-bar pull of the locomotive through the battery section 4.

From the above description, it will be noted that a locomotive constructed in accordance with my invention may be operated as a storage-battery locomotive, and a portion thereof may be conveniently operated from a trolley supply circuit as a unitary locomotive. The articulated connection between the main and the auxiliary truck is adapted to transmit the complete draw-bar pull of the locomotive and thus relieve the battery section of any unnecessary stresses and strains. Inasmuch as the main truck is provided with a very short wheel base in order to reduce the length of the locomotive, it is very desirable to support a portion of the weight of the battery section on the main truck in order to improve the riding qualities thereof. Accordingly, the battery section 4, which is located over the auxiliary truck 3, is provided with the projection 16 which extends from the battery section in a manner to transmit a portion of the weight of the battery section to the main truck. Moreover, it will be noted that the battery section is pivoted to the main truck and to the auxiliary truck in a manner to prevent the draw-bar pull of the locomotive being transmitted through the battery section but in a manner to maintain the battery section in line with the trucks.

Modifications in the structure and arrangement and location of parts may be made within the spirit and scope of my invention and such modifications are intended to be covered by the appended claims.

I claim as my invention:

1. In a storage-battery locomotive, the combination with a main propelling truck having a short wheel base, and a low-height idle auxiliary truck having an articulated connection to the main truck, of a battery section disposed above said auxiliary truck and having an extension therefrom for supporting a portion of the weight thereof on the main propelling truck.

2. In a storage-battery locomotive, the combination with a four-wheel propelling truck having a short wheel base, and a low-height weight-carrying auxiliary truck having an articulated connection to the main truck, of a battery section disposed above said auxiliary truck, and means for supporting a portion of the weight of the battery section upon each of said trucks.

3. In a storage-battery locomotive, the combination with a main truck having two pairs of driving wheels and two propelling motors, and an auxiliary truck of low-height having an articulated connection to said main truck, of a battery section mounted on said auxiliary truck and pivotally connected to the main and to the auxiliary truck.

4. In a storage-battery locomotive, the combination with a main truck having a plurality of propelling motors mounted thereon, and an auxiliary truck of low-height having an articulated connection to said main truck, of a battery section located above said auxiliary truck, and a projection from said battery section extending over said main truck and pivotally connected thereto.

5. In a locomotive, the combination with a truck having a number of propelling motors mounted thereon, and an auxiliary idle truck having an articulated connection to said first truck, of a battery section pivotally supported on said auxiliary truck and having a portion extending over and supported on the propelling truck.

6. In a locomotive, the combination with a propelling truck having a plurality of motors mounted thereon, and an auxiliary truck having a storage battery pivotally mounted thereon, of an articulated connection between said trucks, and means for pivotally supporting a portion of the storage battery on said first truck in a manner to permit all stresses and strains to be transmitted through the articulated connection between the trucks.

7. In a locomotive, the combination with a main truck having a propelling motor mounted thereon, and an idle auxiliary truck of low height having an articulated connection to said main truck, of a battery section located over said auxiliary truck and pivotally supported on the main truck and the auxiliary truck.

8. In a locomotive, the combination with a main truck having two pairs of driving wheels, and a low-height four-wheel auxiliary truck having an articulated connection to the main truck, of a battery section located above said auxiliary truck and pivotally connected thereto, said battery section having an extension that is pivotally connected to the main truck.

9. In a locomotive, the combination with a main truck having propelling motors mounted thereon, and an auxiliary truck of low height having an articulated connection to said main truck, of a storage-battery section pivotally supported on said auxiliary truck in order to extend only slightly above the height of said main truck, and means for pivotally supporting a portion of the weight of the battery section on the main truck.

10. In a locomotive, the combination with a main truck having propelling motors mounted thereon, and an auxiliary truck having an articulated connection to the main truck, of a battery section pivotally supported on said auxiliary truck so as to be of substantially the same height as the main truck, and means for pivotally supporting a portion of the weight of the battery section on the main truck.

11. In a storage-battery locomotive, the combination with a main truck equipped with propelling means, of an auxiliary truck of lower height than the main truck, a storage-battery-container section, means for supporting said container section at two points on one of said trucks and at one point on the other truck, and an articulated connection between said trucks.

12. In a storage-battery locomotive, the combination with a main truck equipped with propelling means, of an auxiliary truck, a storage-battery-container section supported on said trucks, and means forming an articulated connection between said trucks independently of the container section so as to avoid transmitting draft strains through the latter.

13. In a storage-battery locomotive, the combination with a main truck equipped with propelling means, of an auxiliary idler truck, said trucks having their ends in abutting relation and shaped to permit free lateral movement while maintaining the abutting relation, a storage-battery-container section supported on said trucks, and means forming an articulated connection between said trucks independently of the container section so as to avoid transmitting pulling and bumping stresses through said container section.

In testimony whereof, I have hereunto subscribed my name this 31st day of May, 1917.

GEORGE H. F. HOLY.